United States Patent [19]

Moncrief

[11] Patent Number: 4,741,262
[45] Date of Patent: May 3, 1988

[54] COLLAPSIBLE RACK FOR MEAT

[76] Inventor: Nellie L. Moncrief, Rte. 1, Box 67B, LaPine, Ala. 36046

[21] Appl. No.: 17,934

[22] Filed: Feb. 24, 1987

[51] Int. Cl.$^4$ .................... A47J 43/18; A47J 37/04
[52] U.S. Cl. ........................... 99/449; 211/181; 211/195; 294/32; 294/151; 294/152; 294/154
[58] Field of Search .......... 99/449, 450, 426, 349–351; 211/181, 195, 130, 132, 201; 294/151–155, 15, 27.1, 32

[56] References Cited

U.S. PATENT DOCUMENTS

| | | | |
|---|---|---|---|
| 497,667 | 5/1893 | Jones | 211/181 X |
| 686,639 | 11/1901 | Sollars | 211/181 X |
| 1,263,863 | 4/1918 | Crosby | 99/449 |
| 1,956,678 | 5/1934 | Hanson | 211/181 X |
| 2,272,314 | 2/1942 | Williams | 294/152 |
| 2,448,319 | 8/1948 | Maranville | 211/181 X |
| 2,703,046 | 3/1955 | Ahlquist | 99/449 |
| 2,973,218 | 2/1961 | Schaum | 294/152 X |
| 3,075,798 | 1/1963 | Smith | 294/15 |
| 3,585,922 | 6/1971 | Peterson | 99/355 |
| 4,027,583 | 6/1977 | Spanek | 99/421 |
| 4,200,040 | 4/1980 | MacRae | 99/426 |
| 4,495,860 | 1/1985 | Hitch | 99/340 |

FOREIGN PATENT DOCUMENTS

| | | | |
|---|---|---|---|
| 1169988 | 9/1958 | France | 99/426 |
| 6141 | of 1910 | United Kingdom | 99/449 |
| 247673 | 2/1926 | United Kingdom | 99/449 |

Primary Examiner—John Petrakes
Attorney, Agent, or Firm—Krass & Young

[57] ABSTRACT

A collapsible support rack includes a generally planar support member connected to a lifting frame by means of a plurality of collapsible members. The rack is particularly well suited for supporting and lifting food products during cooking and is adapted to collapse so as to provide a low profile when not in use.

5 Claims, 2 Drawing Sheets

COLLAPSIBLE RACK FOR MEAT

FIELD OF THE INVENTION

This invention relates generally to cooking apparatus, and more particularly to a rack adapted to support a food product during cooking and to further allow for readly lifting or repositioning of said food article.

BACKGROUND OF THE INVENTION

Cooking of food represents one of the first steps taken toward the development of human culture. Archaeological evidence has been found indicating that our primative humanoid ancestors frequently and regularly prepared food items by cooking. The earliest cooking methods involved merely placing food items in a fire or on a bed of coals. As sophistication increased, food was supported on sticks or crudely made racks to facilitate the cooking thereof. Such arrangements resulted in burned or wasted food as well as occassioning injury to the food preparers. As cooking techniques became more sophisticated various ovens, roasting pans and the like were employed.

Roasting, in which an article of food, usually meat, fish or fowl is backed in a pan or pot placed in an oven, is an early, and still popular, cooking technique. A problem encountered in roasting is that of removing food from the roasting pan. This problem is compounded by the fact that most commonly employed roasting pans are relatively deep and most roasted foods are highly proteinaceous and therefore prone to stick to a hot roasting pan. For this reason there was perceived a need for some means for the removal of roasted food from a pan which would not cause damage to the cooked food or expose the food preparer to dangers of burns.

Over the years, many utensils have been developed for the purpose of removing food from cooking vessels. For example, U.S. Pat. No. 1,263,863 of Crosby discloses a fish or fowl lifter comprised of a rigid support rack having a pair of handles attached thereto. U.S. Pat. No. 2,703,046 of Ahlquist discloses a flexible holder for supporting a piece of meat or fowl in a cooking vessel. A similar flexible holder is disclosed in U.S. Pat. No. 3,075,798 of Smith. U.S. Pat. No. 3,585,922 of Peterson discloses a roaster basket which is mechanically adjustable to accommodate various sized food items.

All of the foregoing patents describe holders or cradles for supporting an article of food during cooking and for removing the cooked article from a pan thereafter. One problem encountered in the use of all such prior art apparatus is that the holder or cradle itself interferes with the cooking process. In some instances, the holder prevents covering of a roasting pan because of projecting handles and the like. In other instances, portions of the holder contact the upper surface of the article being cooked therein so as to prevent basting or other operations the food preparer may choose to carry out.

The ideal rack for use in roasting meat and the like would be one that would allow for ready lifting and positioning of the food in a roasting pan but which would effectively "disappear" during the cooking process until again needed to remove the cooked food from the pan. It would also be preferable that such a roasting rack would be capable of being placed directly upon a serving platter without interfering with the carving and serving of the cooked food.

The present invention provides a novel and useful support rack particularly well suited for the roasting or other cooking of large items such as fowl, fish and large cuts of meat. The support rack of the present invention is collapsible so that when placed in a roasting pan no interference with either the cooking process or the roasting pan is encountered. The support rack of the present invention allows for ready removal and serving of the cooked food product without waste. Accordingly, it will be appreciated that the support rack of the present invention is a novel and useful food preparation implement allowing for easy and economical cooking and serving of large items of food. These and other advantages of the present invention will be apparent from the summary, drawings and their description and claims which follow.

SUMMARY OF THE INVENTION

There is disclosed herein a collapsible rack for supporting and lifting food products during cooking. The rack comprises a generally planar support member adapted to retain an item of food thereupon, a lifting frame and a plurality of collapsible members interconnecting the lifting frame to the periphery of the support member so as to allow for placement and lifting of the supported article of food. The lifting frame may optionally include a pair of handles on opposed ends thereof.

In one embodiment of the instant invention, the support member is a generally oval member including a number of openings therein; and the lifting frame is a generally oval member being larger in dimension than the support member. In this embodiment, the lifting frame and the support member are interconnected by a number of chain-like members.

In yet other particular embodiments, the support member may be a wire rack and may include a number of upwardly projecting portions for positioning the food item thereupon or on a number of downwardly projecting legs for elevating the support member above the base of a roasting pan so as to the food item away from cooking juice.

In other particular embodiments, the collapsible members may comprise links of chain such as link chain or beaded chain, while in other embodiments, the collapsible members may be interconnected so as to form a web-like structure joining the support member and the lifting frame.

DETAILED DESCRIPTION OF THE PREFERRED EMBODIMENTS

Figure 1:
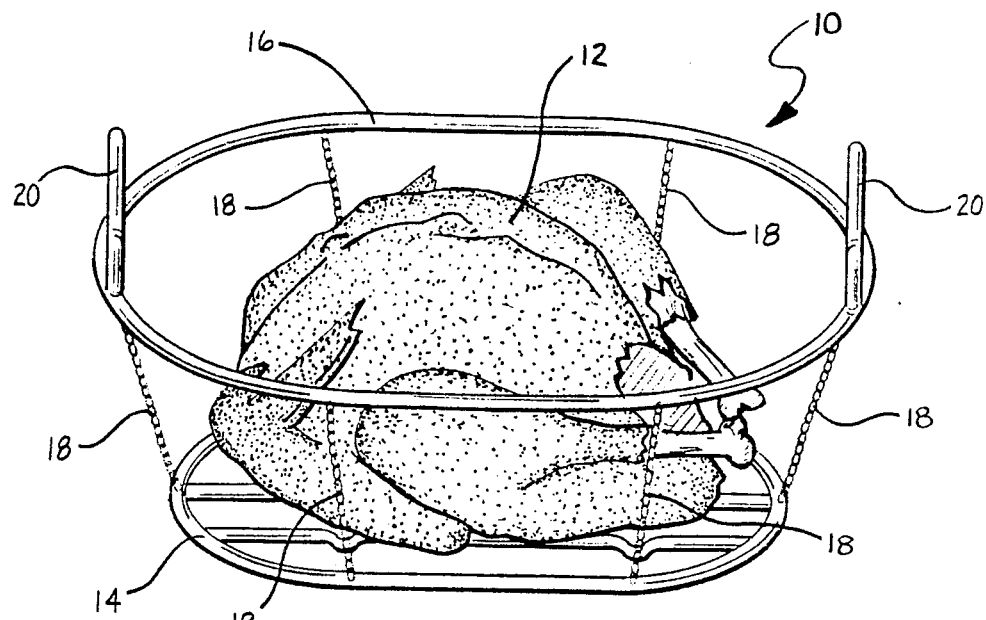
FIG. 1 is a perspective view of one particular support rack of the instant invention illustrating the manner in which an item of food is retained therein.

Referring now to FIG. 1, there is shown a perspective view of one particular collapsible support rack structured in accord with, and illustrating the principles of the instant invention. The rack 10 of FIG. 1 is shown in its non-collapsed stage and as having a large fowl 12, as for example a turkey retained therein. The support rack of the instant invention will be disposed in this configuration when transporting the fowl 12 either into or from a roasting pan. The rack 10 includes a base 14 which is a generally planar support member and is adapted to receive and retain an item of food thereupon.

The support rack further includes a lifting frame 16 which is connected to the base 14 by a number of collapsible members, in this instance a plurality of short links of chain material 18. The lifting frame 16 is configured to be sufficiently large so as to not interfere with the base 14 or the article of food 12 thereupon, when the rack is collapsed. The lifting frame 16 may optionally include a pair of handles 20 disposed so as to allow for the ready lifting and carring of the support rack 10. As illustrated, these handles 20 are formed on opposite sides of the lifting frame 16 and comprise two U-shaped members affixed to the frame 16. Obviously, other such arrangements may be employed; for example, portions of the lifting frame 16 itself may be bent upwards so as to provide lifting handles. Alternatively, removable handles having hook like attachments may be employed to lift the rack 10.

Figure 2:
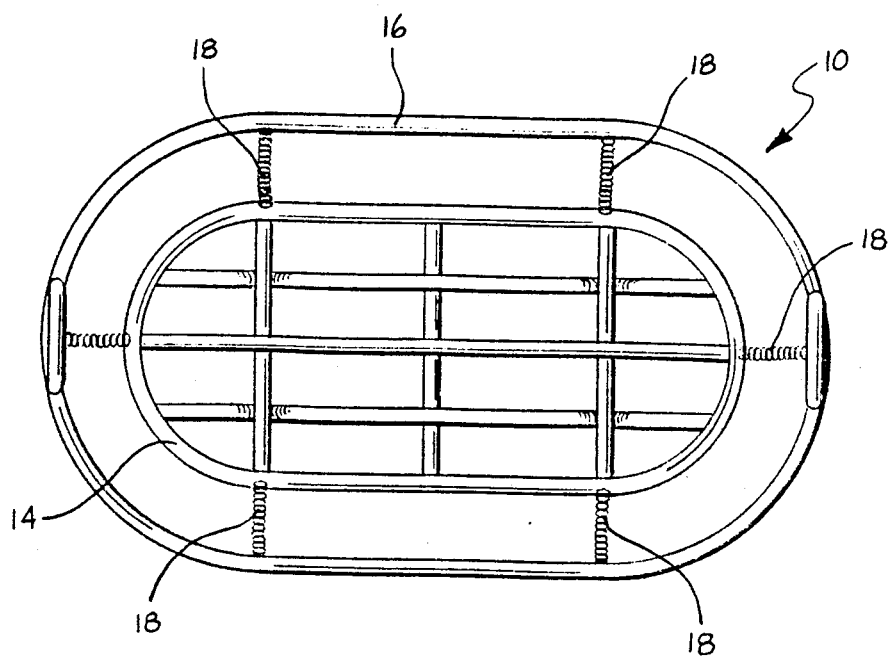
FIG. 2 is a top plan view of the support rack of the instant invention.

Referring now to FIG. 2 there is shown a top plan view of the support rack of FIG. 1. Apparent from FIG. 2 is the manner in which the lifting frame 16 is sized and configured so as to avoid interfering with the base 14. FIG. 2 also makes apparent the manner in which the base 14 and the lifting ring 16 are interconnected via flexible, collapsible members 18.

As depicted in FIG. 2, the base 14 comprises a grid-like frame work formed from a plurality of interconnected metal wires. Such a structure may be readily fabricated by one of skill in the art of metal fabrication by techniques such as welding, brazing soldering and the like. It should be appreciated that the base member of the rack of the instant invention need not be precisely so configured but may rather be any generally planar member haviing sufficient rigidity to support an article for cooking. It is usually preferable that the base include a channel or a number of openings therein to facilitate drainage of liquid from the roasting food. With those principles in mind one may readily fabricate alternative base members. For example, a solid sheet of material, such as a sheet of aluminium, stainless steel and the like may be provided with a number of openings therein and such a member may be readily employed as a base for a collapsible support rack in accord with the principles of the instant invention.

Figure 3:
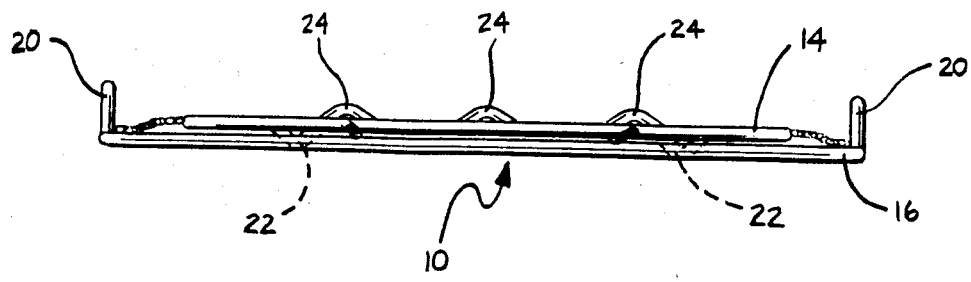
FIG. 3 is a side elevational view of a support rack of the instant invention as disposed in a collapsed position.

Referring now to FIG. 3, there is shown in side elevational view a collapsible rack, generally similar to those of FIGS. 1 and 2 as disposed in a collapsed position. It will be apparent from the Figure that when the rack 10 is in a collapsed state, the lifting frame 16 is clear of the base 14. Readily apparent from FIG. 3 are a number of projections extending from the base 14. A first group of projections 22 comprise legs which are directed downward and are adapted to elevate the base 14 from the surface on which it rests. It is generally preferred that roasting racks include such legs for purposes of maintaining food free and clear from any liquids which may collect in a roasting pan. Such projections or legs 22 may be readily formed by either welding or otherwise affixing a number of projecting members upon the underside of the base 14. In those instances where the base 14a is formed of wire, the legs may be provided by bending small projecting portions into the wire. In those instances where the base 14 is a solid member, the projections 22 may be formed by stamping techniques and the like.

The base 14, as illustrated in FIG. 3, further includes a plurality of upwardly projecting positioning portions 24. These projections 24 serve to anchor or center an article of food placed on the base 14 so as to prevent sliding or rolling thereof. Such projections 24 may be formed by techniques previously described and the placement thereof will be a matter of choice.

It will be noted from FIG. 3 that the handles 20 are configured so as to project upwards and above the support base 14. Such configuration allows for readily retreival of the support rack 10 from a roasting pan in which it is disposed. By making the handles 20 sufficiently long, it is assured that they will project over and above any liquid accumulated in the pan.

It will be appreciated from FIG. 3 that the support rack of the instant invention collapses to a relatively low profile and accordingly does not interfere with subsequent cooking steps. When the rack is collapsed, the food article disposed thereupon is unencumbered by any hardware whatsoever, therefore heat flow is unimpeded assuring even cooking and browning of the food. Similarly, access to the food item for purposes of basting, glazing, carving or other such operations is likewise unimpeded. Another advantage of employing such a collapsible support rack is that the rack may be employed with roasting pans of various sizes. Whereas heretofore available roasting racks had to be sized so as to fit within a roasting pan, the rack of the instant invention readily adapts to fit any size roaster. Furthermore, it will be appreciated that the rack also stores very compactly.

Figure 4:
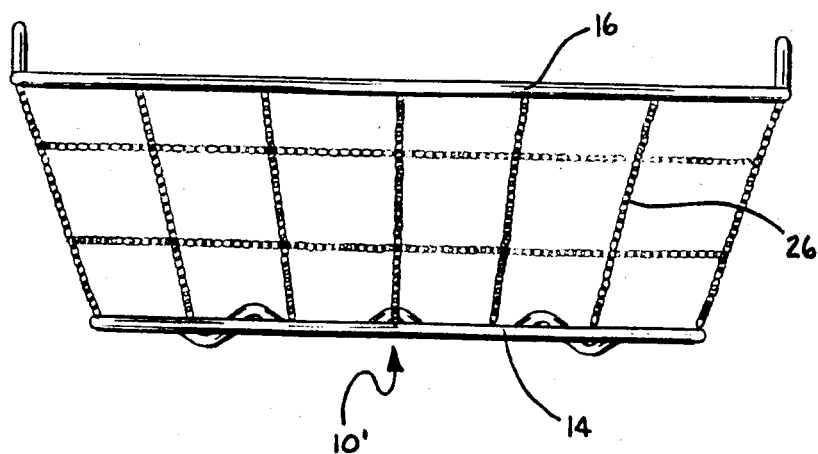
FIG. 4 is a side elevational view of another support rack of the instant invention illustrating the use of a web-like collapsible connection between the lifting frame and support member thereof.

There are numerous other configurations of roasting racks which may be fabricated in accord with the principles enunciated herein. Referring now to FIG. 4, there is illustrated, in side elevational view, another support rack of the instant invention. The rack 10' of FIG. 4 is generally similar to the aforedescribed rack insofar as it includes a lifting frame 16 and a support base 14 generally similar to those described. Where the rack 10' of FIG. 4 differs from the previously described rack is in that the collapsible member connecting the lifting frame 16 to the support base 14 is a netlike structure 26. The netlike structure 26 is comprised of a plurality of collapsible members interconnected so as to form a network. The collapsible members of the network 26 may be chainlike members as previously described. It is anticipated that other such modifications will be readily apparent to one of skill in the art. For example, the collapsible members may comprise cables or springs.

There are a wide variety of materials available for fabrication of the subject support rack. For example, metals such as aluminum, stainless steel, plated steel, mild steel and brass may be advantageously employed to fabricate various portions of the rack. There are presently available a number of high temperature resistant polymeric materials and it is anticipated that such materials may also be advantageously employed in fabrication of racks in accord with the instant invention. For example, high temperature fibrous materials may be employed to form the collapsible connectors. Similarly, the support base or the lifting rings may be fabricated from such high temperature synthetic polymeric materials.

Still other modifications of the illustrated support racks may be made in accord with the principles disclosed herein. For example, a relatively elongated rack may be fabricated for use in conjunction with fish poachers and the like. Likewise, other configurations may be readily fabricated for other special purposes. It will also be readily appreciated that the support rack of the instant invention may be employed for cooking techniques other than roasting. For example, the rack disclosed herein may be employed in conjunction with deep fat fryers, boilers, steamers and pressure cookers. All of such modifications are within the scope of the present invention and the foregoing drawings and discussion are merely meant to be illustrative of the principles thereof. It is the following claims, including all equivalents, which define the scope of the instant invention.

What is claimed is:

1. A combination supporting and lifting utensil for roasts comprising:
   a generally planar base formed of a closed, peripheral outer wire and an open grid of interior wires, each interior wire having its opposite ends secured to spaced points on the outer wire to form an upper surface for supporting a roast or the like and a lower surface adapted to maintain said roast or the like in spaced relationship from a surface on which it is disposed;
   a rigid lifting ring formed of a closed loop of wire having a shape similar to the peripheral wire of the base;
   a pair of handle members joined to the lifting ring at diametrically opposed locations; and
   a plurality of elongated flexible members, each having one end secured to the peripheral wire of the base and its opposite end secured to a complementary point on the lifting ring, at locations spaced with respect to one another around the perimeter of the base and the lifting ring, the lifting ring and the peripheral wire of the base forming the sole interconnection between said flexible members,
   whereby said utensil may be disposed on the bottom of a roasting pan with the flexible members collapsed and the lifting ring disposed adjacent the peripheral wire of the base, and a roast supported on the upper surface of the base may be lifted from the roasting pan by raising the lifting ring through forces applied to the handles so that the center of gravity of the roast is disposed below the lifting ring.

2. The utensil of claim 1 wherein the peripheral wire of the base and the lifting ring are generally oval.

3. The device of claim 2 wherein the dimensions of the lifting ring are larger than the dimensions of the peripheral wire of the base so that when in a collapsed condition, the lifting ring surrounds the base.

4. The device of claim 1 including a plurality of leg members formed at spaced points on the lower surface of the base and extending laterally therefrom so as to raise the base slightly above a supporting surface.

5. The device of claim 1 wherein the flexible members comprise chains.

* * * * *